Figure 1:
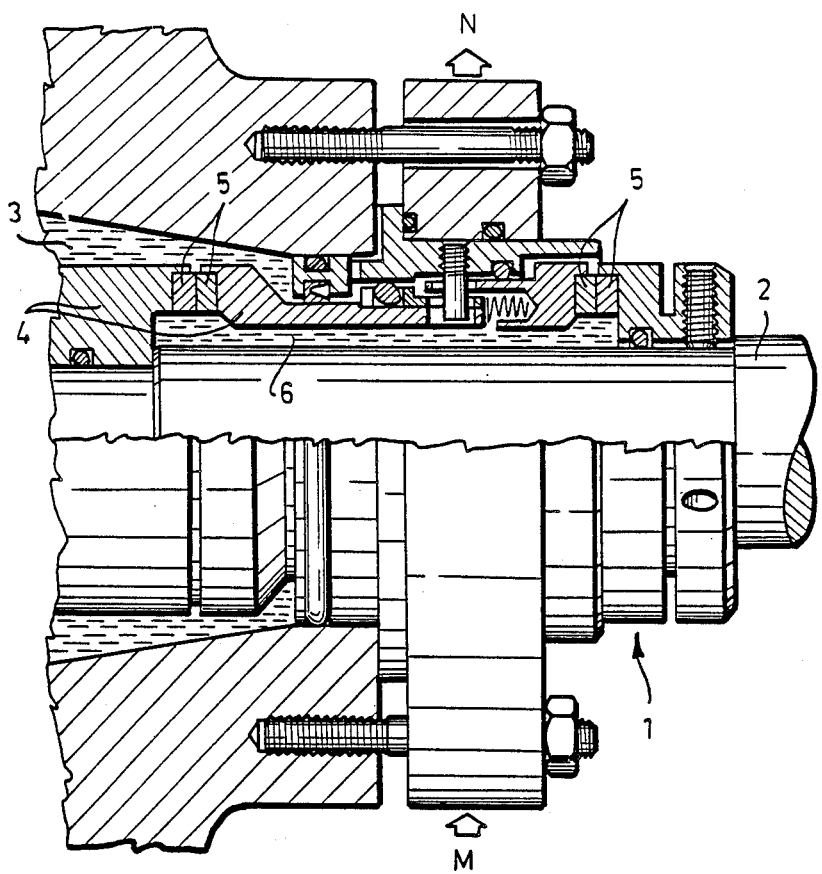

United States Patent [19]

Lummila et al.

[11] Patent Number: 4,773,655
[45] Date of Patent: Sep. 27, 1988

[54] SLIDE RING SEAL

[75] Inventors: Markku Lummila; Esa Salovaara; Esko Lopperi, all of Jyväskylä ; Juhani Ljokkoi, Muurame; Juhani Kuusela, Korpilahti, all of Finland

[73] Assignee: OY Safematic Ltd., Muurame, Finland

[21] Appl. No.: 6,063

[22] Filed: Jan. 22, 1987

[30] Foreign Application Priority Data

Jan. 22, 1986 [FI] Finland ................................. 860303

[51] Int. Cl.$^4$ ......................... F16J 15/34; F16J 15/38
[52] U.S. Cl. ..................................... 277/81 R; 277/9; 277/38; 277/86; 277/87; 277/93 SD
[58] Field of Search ................ 277/9, 96.1, 81 R, 181, 277/207 A, 189, 169, 93 SD, 93 R, 38, 44, 193, 194, 85, 86, 87; 285/334.4, 381, 328

[56] References Cited

U.S. PATENT DOCUMENTS

| | | | |
|---|---|---|---|
| 2,657,077 | 10/1953 | Woodling | 285/334.4 X |
| 2,862,736 | 12/1958 | Russell | 277/169 |
| 3,567,258 | 3/1971 | Scaramucci | 285/334.4 |
| 3,752,509 | 8/1973 | Stafford | 285/334.4 |
| 3,765,689 | 10/1973 | Adams | 277/81 R X |
| 4,261,581 | 4/1981 | Hershey | 277/9 |
| 4,395,049 | 7/1983 | Schertler | 277/169 X |
| 4,424,411 | 1/1984 | Clabburn | 285/381 X |
| 4,552,389 | 11/1985 | Babuder et al. | 277/189 X |
| 4,613,142 | 9/1986 | Heilala | 277/81 R |
| 4,629,221 | 12/1986 | Lumsden et al. | 285/381 X |

FOREIGN PATENT DOCUMENTS

| | | | |
|---|---|---|---|
| 3103551 | 8/1982 | Fed. Rep. of Germany | 285/334.4 |
| 219326 | 7/1924 | United Kingdom | 277/189 |
| 1126711 | 9/1968 | United Kingdom | 285/381 |

Primary Examiner—Allan N. Shoap
Attorney, Agent, or Firm—Cushman, Darby & Cushman

[57] ABSTRACT

The invention relates to a slide ring seal for sealing a shaft rotatable with respect to a wall, which seal comprises a body portion and seal rings provided with slide rings, which seal rings are so arranged with respect to each other that the sealing slide faces of the slide rings are pressed against each other and rotate with respect to each other. Each slide ring is fastened in the seal ring thereof by a shrink fit, whereby the peripheral face of the slide ring is in engagement with a face provided on the seal ring, so that the radial press force of the shrink fit is directed to act on a centroid of the cross-sectional area of the slide ring. In order to ensure that the forces of the shrink fit keep acting accurately on the centroid of the cross-sectional area of the slide ring, at least one of the faces which are in engagement with each other in the shrink fit is convex. The highest point of the convex surface is in a radial plane extending through the centroid of the cross-sectional area of the slide ring.

4 Claims, 2 Drawing Sheets

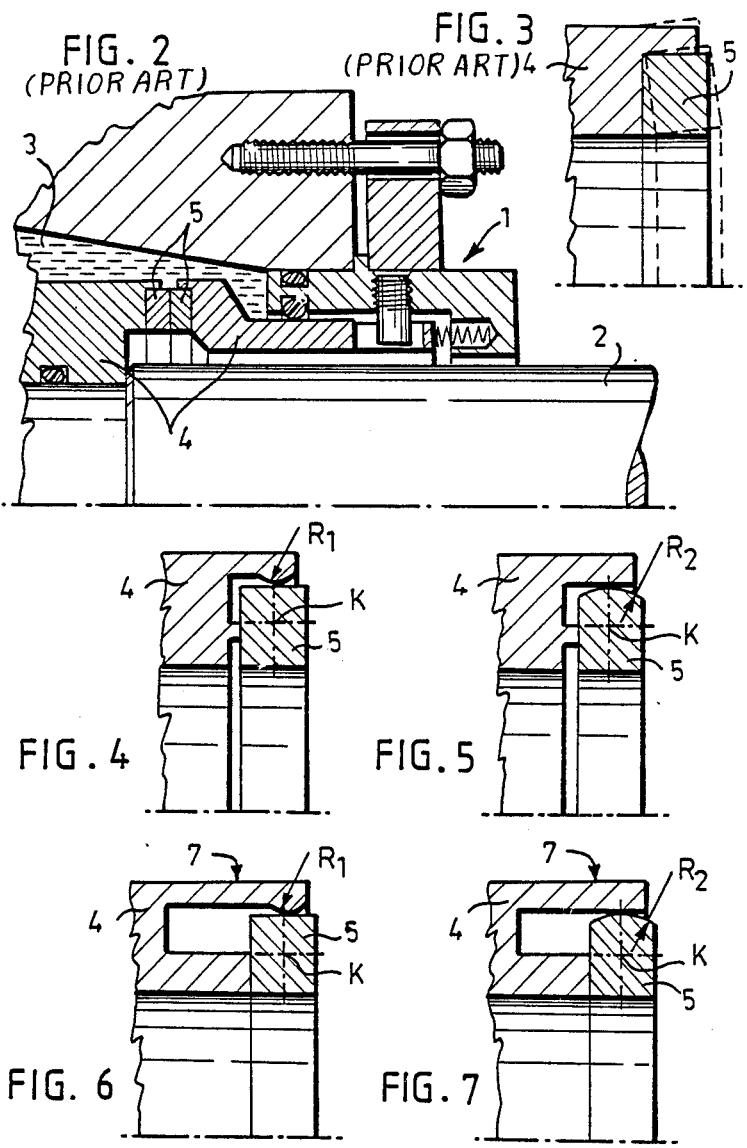

SLIDE RING SEAL

The invention relates to a slide ring seal for sealing a shaft rotatable with respect to a wall, comprising a body portion and seal rings provided with slide rings, the seal rings being so arranged with respect to each other so that the sealing slide faces of the slide rings are pressed against each other and rotate with respect to each other, and each slide ring is fastened in the seal ring thereof by a shrink fit, whereby the peripheral face of the slide ring is in engagement with a face provided in the seal ring, so that the radial press force of the shrink fit is directed to act on a centroid of the cross-sectional area of the slide ring.

These kind of seals are well-known in different technical fields. Slide ring seals are particularly suitable for use in pumps intended for pumping liquids containing solids and impurities in the process industries, for example.

Under wearing conditions the slide rings of slide ring seals are usually manufactured of e.g. hard metals, oxide ceramics or silicon carbides. Such wear-resistant materials are necessary, because the slide rings are exposed to both adhesive and abrasive wearing when they rotate against each other. The body portions of the seals are generally manufactured of acid-proof steel, for instance. It is, however, obvious that the materials are always selected according to the operating conditions in each particular case.

In prior solutions the wear-resistant slide rings of slide ring seals are seated in the seal ring thereof by a shrink fit, whereby the seal ring is first heated so that it expands to such an extent that the slide ring can be fitted in a recess formed in the seal ring. When the seal ring cools, the slide ring gets squeezed, being thus fastened in place. A drawback of this way of fastening is that the slide face of the slide ring gets distorted as a result of a press force acting in the radial direction. It is clear that this distortion can be compensated by machining the slide face at the production stage; however, an initially planar slide face may distort considerably under operating conditions in which the temperature may considerably deviate from the machining temperature of the slide face. It is likewise obvious that an efficient sealing cannot be obtained by means of a distorted face. Furthermore, practice has shown that slide rings fastened as described above wear rapidly, because the slide faces to be positioned against each other when the slide rings are in operation do not extend in parallel over the whole area thereof, but the distance between the faces is smaller at one edge and correspondingly larger at the other edge. In other words, the slide faces are at an angle with respect to each other. The problem is further aggravated by the fact that the seal ring tends to get distorted in use. This takes place e.g. due to the thermal expansion in such a manner that the outer periphery of the seal ring, which is exposed to the warm product, expands to a greater degree than the inner periphery, which is cooled by the sealing liquid or air. The pressure of the product also causes distortion in the same direction.

These drawbacks have been known for a long time, and many solutions have been developed for the elimination thereof. Such solutions include those disclosed in U.S. Pat. No. 4,261,581. It is known from this U.S. publication to direct the radial press force of the shrink fit to the centre of the cross-sectional area of the slide ring. As pointed out in the publication, such a solution is not sufficient, because the axial distortions occurring in the seal ring further distort the slide face of the slide ring. In fact, the invention disclosed in U.S. Pat. No. 4,261,581 relates to the formation of an axial clearance between the slide ring and the seal ring, so that the slide ring is supported on the seal ring solely by a supporting force going through the centre of the cross-sectional area of the slide ring. This solution is disadvantageous in that the slide ring has to be extremely rigid, because no support is provided in the axial direction. Further, the transmission of heat from the slide ring to the seal ring is very difficult on account of the small area of support of the slide ring.

In certain prior solutions the radial press force of the shrink fit cannot quite accurately be directed to the central line of the cross-sectional area of the slide ring. This inaccuracy also causes distortion of the slide ring.

In prior solutions the annular contact face of the shrink fit also causes the slide ring to be distorted, because no so-called fulcrum point is formed between the seal ring and the slide ring, the point of contact being an annular plane.

Also, the seal rings of prior solutions are too rigid in the area around the shrink fit. Therefore the seal ring does not yield, but tends to distort the slide ring.

The object of the invention is to provide a slide ring seal which avoids the drawbacks of prior solutions. This is achieved by means of a slide ring seal according to the invention, which is characterized in that at least one of said faces which are in engagement with each other in the shrink fit being convex so that the highest point of the convex surface lies in a radial plane extending through the centroid of the cross-sectional area of the slide ring.

The idea of the structure according to the invention is that the contact point between the seal ring and the slide ring acts as a kind of articulated fulcrum so that the radial forces always act on the central line of the cross-sectional area of the slide ring in spite of the expansion of the seal ring. This can be further ensured by providing the seal ring with a sufficient resilience.

The invention is advantageous in that the slide ring can be supported highly efficiently both radially and axially, so that the slide face is not distorted even though the temperature would change suddenly. By virtue of the structure of the solution according to the invention the operating costs of the seal are very advantageous, because the slide faces rotating against each other are accurately in parallel under operating conditions, so that the sealing is efficient and the lubrication between the two slide faces is even, and uneven wearing and sudden breaks of the slide rings are avoided. These matters are of essential importance in seals in which no separate sealing liquid is used.

The invention will be described in the following by means of embodiments shown in the attached drawing, wherein FIG. 1 is a general view of an example of a known slide ring seal construction, FIG. 2 is a general view of an example of another known slide ring seal construction, FIG. 3 is an enlarged view of a fastening structure used in connection with the known constructions of FIGS. 1 and 2, FIGS. 4 to 7 illustrate generally different embodiments of the fastening structure of the slide ring according to the invention.

FIGS. 1 and 2 illustrate generally two prior slide ring seal constructions. Corresponding parts in FIGS. 1 and 2 are indicated by the same reference numerals. Accordingly, the body portion of the seal construction is generally indicated by the reference numeral 1. A rotatable shaft, such as a pump shaft, is indicated by the reference numeral 2, and the product to be pumped by the reference numeral 3. Seal rings in the slide ring seal are indicated by the reference numeral 4, and slide rings attached to the seal rings correspondingly by the reference numeral 5.

Further, a sealing liquid forming a lubrication film between the slide faces of the slide rings 5 is indicated by the reference numeral 6 in the embodiment of FIG. 1. FIG. 1 also shows the inlet and the outlet of the sealing liquid, which are indicated generally by the arrows M and N respectively.

The matters set forth in connection with FIGS. 1 and 2 are completely obvious to one skilled in the art, so the construction according to said figures is not discussed in more detail in this connection.

The detail shown as a general enlarged view in FIG. 3 is indicated by means of a circle in FIGS. 1 and 2. However, it is self-evident that the FIG. 3 may illustrate any one of the slide rings shown in FIGS. 1 and 2. The same reference numerals as in FIGS. 1 and 2 have been used in FIG. 3 at corresponding points.

In the known construction according to FIG. 3 the slide ring 5 is fastened in the seal ring 4 by means of a radially acting shrink fit. The shrink fit is formed in a known manner by heating the seal ring 4 so that it expands. The slide ring 5 is thereafter fitted in the expanded seal ring, which shrinks when it cools, and the slide ring 5 is fastened within the seal ring 4. In FIG. 3, the continuous lines illustrate a situation in which the slide ring 5 has been fitted in the seal ring 4, and the broken lines illustrate the situation after the cooling of the seal ring is completed.

It is to be understood that the situation indicated by means of the broken lines in FIG. 3 is strongly exaggerated. Distortions of such dimensions are not actually formed. However, it is a fact that the slide face of the slide ring 5, which face is represented by the right-hand free face in FIG. 3, is distorted in principle similarly as shown in FIG. 3. The flare formed in the slide ring 5 after the cooling can be removed by grinding the slide face even. The problem, however, is not eliminated by this grinding, because in practice the slide ring 5 is distorted under operating conditions in which the temperature exceeds the grinding temperature, which is due to the fact that the seal ring 4 expands, and, as a result, the press force acting on the slide ring 5 is decreased. These phenomena are completely obvious in the art.

The drawbacks mentioned above are eliminated by means of the slide ring seal according to the invention. FIGS. 4 to 7 illustrate generally different embodiments of the invention. These figures illustrate the same detail as is shown in FIG. 3. The same reference numerals as in FIG. 3 are used in FIGS. 4 to 7 at corresponding points.

The invention shown in FIGS. 4 to 7 is based on the idea that all the forces acting on the slide ring 5 are directed to a centroid K of the rectangular cross-sectional area of the slide ring 5, so that when the seal ring 4 is warmed and expanded, i.e. when the press fit is loosened, the influence of these forces is as accurately as possible maintained at the centroid K of the cross-sectional area of the slide ring 5. This property results from that the peripheral face of the slide ring 5 and/or that face of the seal ring 4 which is in engagement with the peripheral face within the shrink fit is a convex surface. This convex surface is so positioned that the highest point thereof is in a radial plane going through the centroid K of the cross-sectional area of the slide ring 5.

In FIGS. 4 to 7, said convex surface is indicated by means of the radius of curvature $R_1$, $R_2$ of the surface. In the embodiment of FIGS. 4 and 6 the convex surface is formed on the seal ring 4. The degree of curvature of the contact face between the seal ring 4 and the slide ring 5 in the axial direction is thereby represented by means of the radius of curvature $R_1$. In the embodiment of FIGS. 5 and 7 the convex surface is formed on the peripheral face of the slide ring 5. The degree of curvature of the contact face between the seal ring 4 and the slide ring 5 in the axial direction is in this case represented by the radius of curvature $R_2$.

In the embodiment of FIGS. 6 and 7 that face of the seal ring 4 which is pressed against the peripheral face of the slide ring 5 is formed on an annular axial projection 7 which is substantially longer than the width of the slide ring in the axial direction. By virtue of this structure the stress exerted on the seal ring 4 by the shrink fit is reduced. As stated above, the projection 7 provided on the outer periphery of the seal ring is as long as possible, so that the slide ring 5 is in fact fastened at the end of a pipe. By means of this solution the annular projection 7 on the outer periphery of the seal ring 4 is provided with resilience, as a result of which the stress exterted on the slide ring 5 is reduced as compared with prior structures.

In the embodiments of FIGS. 4 to 7 the axial supporting force of the slide ring 5 is entirely directed to act on the centroid K of the cross-sectional area of the slide ring 5. In practice, this is effected by providing the radial counter face of the seal ring with a rib which directs the axial supporting force to the slide ring 5. The rib is thereby so positioned that its radially outer edge lies on an axial cylinder surface extending through the centroid K. The axial support of the slide ring 5 can also be effected in various other ways, because the distortion of the slide ring 5 within the shrink fit is insignificant in the structure according to the invention.

The above examples are by no means intended to restrict the invention, but the invention can be modified within the scope of the attached claims in various ways. Accordingly, it is self-evident that the different parts do not necessarily need to be exactly similar to those shown in the figures. The invention can be applied both in seals in which a sealing liquid is used and in seals in which no sealing liquid is used. The radii of curvature $R_1$ and $R_2$ and the length of the projection 7 can be chosen to meet the requirements in each particular case.

What is claimed is:

1. A slide ring seal for sealing a shaft rotatable with respect to a wall, comprising:
   seal rings provided with slide rings, said seal rings being so arranged with respect to each other that the sealing slide surfaces of the slide rings are pressed against each other and rotate with respect to each other, and each slide ring is fastened in the seal ring thereof by a shrink fit, whereby the peripheral face of the slide ring is in engagement with an axial face provided in the seal ring, wherein at least one of said faces which are in engagement with each in the shrink fit being convex so that the most radially extended point of the convex surface lies in a radial plane extending through the centroid of the cross-sectional area of the slide ring so that the radial press force of the shrink fit is directed to act on a centroid of the cross-sectional area of the slide ring.

2. A slide ring seal according to claim 1 wherein the axial face of the seal ring which is pressed against the peripheral face of the slide ring is formed on an annular projection extending in the axial direction of the seal and having a length substantially greater than the axial width of the slide ring.

3. A slide ring seal according to claim 1 or 2, wherein the convex surface is formed on that face of the seal ring which is pressed against the peripheral face of the slide ring.

4. A slide ring seal according to claim 1 or 2, wherein the convex surface is formed on the peripheral face of the slide ring.

* * * * *